Nov. 21, 1939. L. A. VERZI 2,180,918
FISH LURE
Filed Jan. 13, 1938
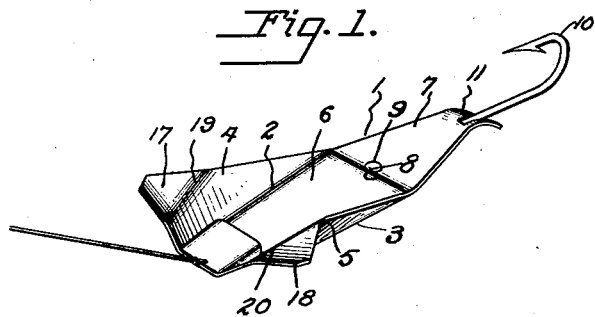
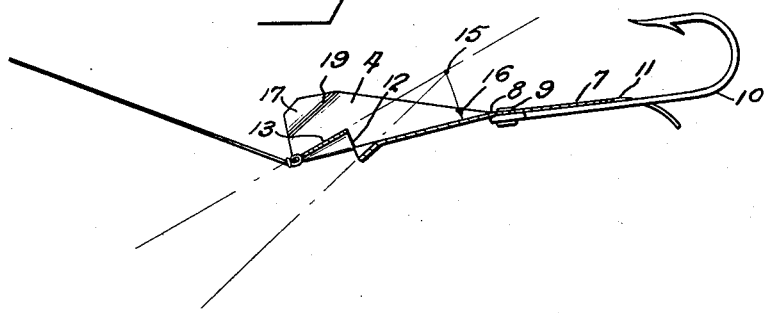
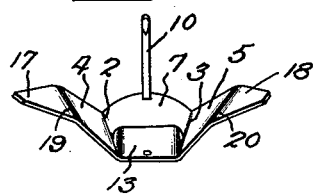
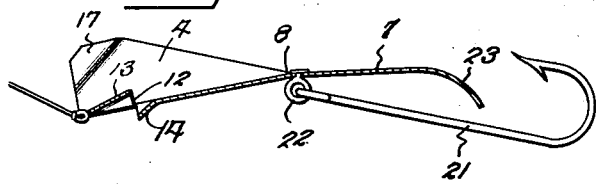
Inventor
L. A. Verzi
By Mason Fenwick & Lawrence
Attorneys Patented Nov. 21, 1939

2,180,918

UNITED STATES PATENT OFFICE 2,180,918

FISH LURE

Linus A. Verzi, Arlington, Va., assignor of one-half to Emery N. Hosmer, Arlington County, Va.

Application January 13, 1938, Serial No. 184,865

7 Claims. (Cl. 43—42)

This invention relates to an artificial fish lure, the novel construction of which gives it a complex of movements in the water which are particularly attractive to fish.

One of the objects of the invention is to provide a fish lure, preferably of bright material, characterized by a reluctance to spinning, but which when drawn through the water will dart from side to side, at the same time teetering about its longitudinal axis, thereby producing varying light reflections which catch the attention of the fish.

Another object is to provide a fish lure of sheet material having laterally flat base surface which enables the lure to side-slip to right or left causing the darting motion, having divergent wings which partially stabilizes the lure against spinning and which by tilting alternately against the forward water pressure initiate the darting movements as well as cause the teetering, the forward apices of the wings being deflected at a flatter angle than the general slope of the wings, thereby dampening the oscillating movements of the lure and providing another inhibiting factor to spinning.

A further object of the invention is to construct the lure with an upper deflecting surface by means of which a jet of water is created above the lure, and a lower deflecting surface for projecting a jet of water against the upper jet at a point above the lure, creating a downward force component against the lure which stabilizes the lure.

With the above and other objects in view, the invention comprises the novel construction illustrated in the accompanying drawing and disclosed in the following specification.

In the drawing:

Figure 1 is a perspective view of a lure embodying the principles of the present invention;

Figure 2 is a side section;

Figure 3 is a front view and

Figure 4 is a side section through a modified form of the invention.

Referring now in detail to the several figures, the numeral 1 represents a triangular piece of sheet material preferably of bright metal having the form of an isosceles triangle, the altitude of which is preferably longer than the base and the base forming the front of the lure. The triangular piece or blank is stamped along the lines of fold 2 and 3 to form wings 4 and 5 which diverge upwardly. The lines of fold 2 and 3 preferably intersect the front or base of the triangle at points which approximately divide the length of the base into three parts, the outer parts being divergent with respect to the middle part and the lines of fold preferably intersect the legs of the triangle at points which divide the legs into halves. Thus the wings embrace the base angles of the triangle and the lines of fold define a trapezoidal base or body 6 which is substantially flat. This flat surface which may be considered a keelless base for the lure permits the lure to slip sidewise through the water in executing its darting movement. The rear portion 7 of the lure is manually bendable along a transverse line 8 which joins the rear ends of the lines of fold 2 and 3. Bending at this point provides an adjustment of the diving angle of the lure.

In that form of the invention illustrated in Figures 1, 2 and 3, the hook is rigidly attached to the rear portion 7 at some point to the rear of the line of bend 8. In the drawing the hook 10 is shown as being riveted or soldered to the rear portion 7 at the point 9. In this form of the invention the rear portion 7 is bent downwardly adjacent the apex of the triangle and slotted as at 11 to receive the shank of the hook.

The forward portion of the trapezoidal base 6 is formed with a transverse slit which is spread open substantially in a plane perpendicular to said trapezoidal base forming a slot 12 through which a jet of water flows upwardly and toward the rear as the lure is drawn through the water. The upper wall 13 of the slot forms a plane which displaces the water above it in the forward movement of the lure creating a jet which flows upwardly and rearwardly parallel to the wall 13. The lower wall 14 of the slot is bent down so as to lie in a plane which intersects the plane of the upper wall at a point 15 overlying the flat trapezoidal base of the lure. This lower wall 14 causes the jet which flows through the slot to impinge against the jet created by the upper wall 13 in the region of the point 15 whereby the velocity of the lower jet is checked and a downward force component created indicated by the arrow 16, see Figure 2, which presses against the upper face of the trapezoidal base and also the rear portion 7, stabilizing the lure and increasing its reluctance to spinning. Stabilization of the lure is further aided by the dihedral relation of the wings 4 and 5 and also by the wing tips 17 and 18 which are bent angularly downward along the lines of fold 19 and 20.

As the lure is drawn through the water, it will tilt due to the inevitable unbalanced pressure of the water against the wings 4 and 5. As one wing tilts downwardly the dominant pressure is transferred to the wing which simultaneously tilts upwardly, this unbalanced force initiating the sidewise dart of the lure which is facilitated by the flat keelless nature of the trapezoidal base 6. This unbalanced force also causes the lure to oscillate about its longitudinal axis at the same time it is darting, creating varying light reflections which attract the fish. The darting of the lure in one direction will reach its limit when the lateral component of the pull of the fish line overcomes the dominant pressure on that one of the wings 4 and 5 which is at the time in the position of upward tilt. Then the direction of the darting will change. All the while the lure is darting in the same direction, it will oscillate about its longitudinal axis, the amplitude of the oscillation being dampened or snubbed by the resistance of the down-turned wing tips 17 and 18.

It is to be understood that practically all of the surfaces defined by the folding will be planiform. This results in large areas of light-reflection as contrasted with the reflections of linear or point magnitude which emanate from curvilinear.

Figure 4 shows a slightly modified form of the invention in which the hook 21 instead of being rigidly secured to the lure is freely suspended from a ring 22 fixed to the underside of the lure. The hook is arranged with a barb toward the rear so that it may swing above the lure to the position shown in Figure 4. The shank of the hook will of course be long enough to permit the barb to clear the tail 23. In this form of the invention, the tail need not be bifurcated.

It will be understood by those skilled in the art that while I have in the above description disclosed a preferred and practical embodiment of the invention, neither the dimensions nor the exact shape are critical nor is the material of which the lure is made. It will also be apparent that I have devised a lure which can be made at small cost and with the minimum of complication by the mere stamping operation performed on a flat blank.

What I claim is:

1. A fish lure made from a piece of sheet material having approximately the form of an isosceles triangle and having its base to the front, said lure comprising a body which is of trapezoidal form and which extends from the front of the lure to the rear for a distance approximately half the length of the lure, wings extending divergently upward from said body on each side thereof, a tail adjacent to and inclining slightly downward from said body, the length of said tail being approximately half the length of the lure, a hook carried by said lure, and means at the forward part of said body for defining two water jets so deflected as to meet above said lure whereby the velocity of one jet is checked by the other, creating a force component which presses downwardly upon said body, stablizing said lure.

2. A fish lure made from a piece of sheet material having approximately the form of an isoscles triangle and having its base to the front, said lure comprising a body which is of trapezoidal form and which extends from the front of the lure to the rear for a distance approximately half the length of the lure, wings on each side of said body, said wings diverging upward from said body along both sides thereof, a tail adjacent to and inclined slightly downward from said body, the length of said tail being approximately half the length of the lure, and a hook secured to said tail, the barb of said hook being located rearwardly of and above said tail, the forward part of said body being formed with a transverse slot in a plane substantially perpendicular to said body, the upper and lower walls of said slot being inclined in planes which intersect above said body whereby the jets of water passing through the slot impinges the jet directed rearwardly upwardly from the surface of the upper wall of said slot, creating a force component which presses downwardly upon said body, stabilizing said lure.

3. A fish lure made from a piece of sheet material having approximately the form of an isosceles triangle and having its base to the front, said lure comprising a body which is of trapezoidal form and which extends from the front of the lure to the rear for a distance approximately half the length of the lure, wings on each side of the base, said wings diverging upwardly from said base along the entire length thereof, a tail adjacent to and inclining slightly downwardly from said base the length of said tail being approximately half the length of said lure, said tail being bendable along the rear end of said body, said tail being bifurcated, a hook secured to said tail having the shank passing between the bifurcations thereof, the forward part of said body being formed with a transverse slot in a plane substantially perpendicular to said body, the upper and lower walls of said slot being inclined in planes which intersect above said body whereby the jet of water passing through said slot impinges the jet flowing rearwardly, upwardly from the surface of the upper wall of said slot, creating a force component which presses downwardly upon said body stablizing said lure.

4. A fish lure made from a single piece of sheet material having approximately the form of an isosceles triangle and having its base to the front, said lure comprising a body which is of trapezoidal form and which extends from the front of the lure to the rear for a distance approximately half the length of the lure, wings on each side of said body, said wings diverging upwardly from said body along the entire length thereof, a tail adjacent to and inclining slightly downwardly from said body, the length of said tail being approximately half the length of the lure, a hook secured to said tail, the barb of said hook being located rearwardly of and above said tail, and a jet-producing means at the forward part of said body.

5. Fish lure comprising a body of sheet material adapted to plane when drawn through a body of water, having means toward the front for producing upper and lower convergent jets of water, and determining that the point of intersection of said jets shall occur above said body whereby a downward stabilizing force component is directed from said point of intersection upon said body.

6. Fish lure comprising a body of sheet material adapted to plane when drawn through a body of water, said body being formed with a slot toward the front, having upwardly and backwardly convergent walls for producing convergent water jets through the impingement of water against the outer side of the upper wall and the inner side of the lower wall, the convergence of said walls being such as to determine that the point of intersection of said jets shall occur above said body whereby a downward stabilizing force component is directed from said point of intersection upon said body.

7. A fish lure made from a piece of sheet material having initially approximately the form of an isosceles triangle and having its base to the front, said lure comprising a body portion which is of trapezoidal form and which extends from the front of the lure to the rear for a distance approximately half the length of the lure, and having the side portions which are adjacent the base angles of said triangle at an inclination diverging upward from the sides of said body portion, said lure including a rear portion at an inclination to the body portion along the rear side of said body portion, and a hook attached to said rear portion.

LINUS A. VERZI.